UNITED STATES PATENT OFFICE.

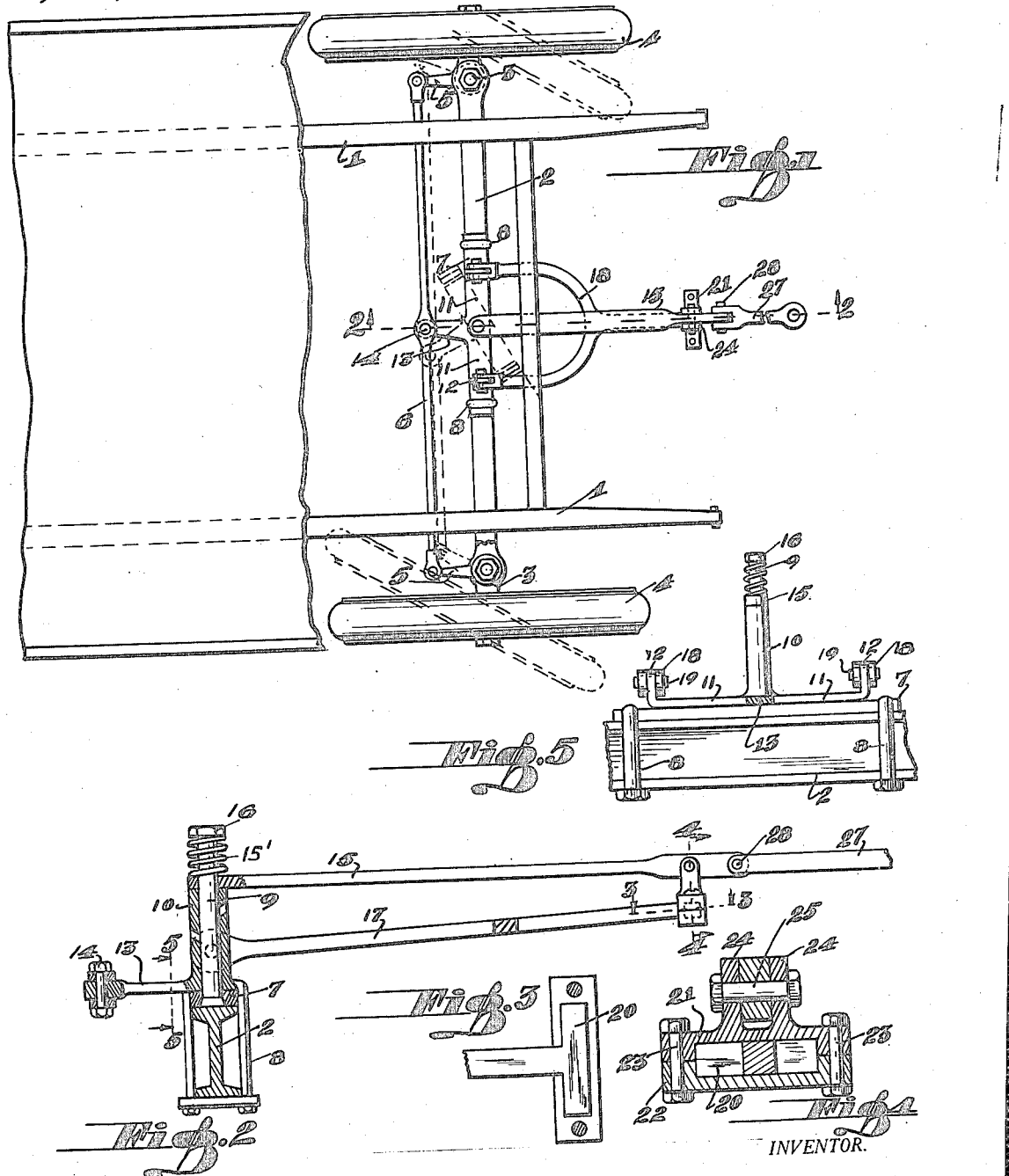

ABRAHAM ARBETBLATT, OF LOS ANGELES, CALIFORNIA.

STEERING GEAR FOR TRAILERS.

1,424,129. Specification of Letters Patent. Patented July 25, 1922.

Application filed July 29, 1920. Serial No. 399,970.

*To all whom it may concern:*

Be it known that I, ABRAHAM ARBETBLATT, a citizen of Russia, residing at Los Angeles, in the county of Los Angeles and State of California, have invented new and useful Improvements in Steering Gears for Trailers, of which the following is a specification.

This invention is a steering gear for trailers adapted to be connected to motor vehicles and the like.

It is the object of the invention to provide an improved construction whereby the front wheels of the trailer will be turned as the pulling vehicle turns for causing the trailer to follow the path of the pulling vehicle.

The invention will be readily understood from the following description of the accompanying drawings, in which—

Figure 1 is a plan view of the front portion of a trailer with the body broken away to show the steering gear.

Fig. 2 is a longitudinal vertical section on the line 2—2 of Fig. 1.

Fig. 3 is a longitudinal horizontal section on the line 3—3 of Fig. 2.

Fig. 4 is a transverse vertical section on the line 4—4 of Fig. 2.

Fig. 5 is a transverse vertical section on the line 5—5 of Fig. 2.

The trailer may be of any usual construction including the frame 1 having the front axle 2 with steering knuckles 3 at the ends thereof forming the usual mountings for the wheels 4. The steering levers 5 of the knuckles are connected by the rod 6 extending across the trailer frame.

A plate 7 is supported upon axle 2 at the center thereof as by the tie yokes 8. A pivot pin 9 projects upwardly from this plate and a bearing 10 is arranged for rotation upon said pivot pin. This bearing is provided at its base with laterally projecting arms 11 terminating in upwardly bent ends 12 and with a rearwardly projecting tie rod 13 pivotally connected to connecting rod 6 as by the pivot bolt 14.

A draw bar 15 extends forwardly from bearing 10 and may be connected thereto by being received over the end of pivot pin 9. A spring 15' shown as a coil spring surrounds pin 9 above the draw bar and a suitable nut 16 is threaded upon the end of pin 9 above said spring. The draw bar is thus yieldably forced against the upper end of bearing 10. A yoke 17 has its arms 18 connected to the respective upturned ends 12 of the lateral extensions 11 as by means of the bolts 19. This yoke is connected to draw bar 15 as by providing a cross arm 20 upon the end of said yoke and clamping said cross arm in brackets 21—22 connected by the bolts 23. The uppermost of said brackets is provided with upwardly projecting lugs 24 arranged to lie alongside the respective sides of the draw bar with the bolt 25 extending through said lugs and the draw bar and which bolt serves as a pivot for said draw bar.

Any suitable connecting means, such as an eye bar 27 may be pivoted to the forward end of the draw bar as by the pivot bolt 28.

In operation it will be seen that when the pulling vehicle attached to the eye bar 27 turns, the yoke 17 and the draw bar 15 will be turned upon the pivot pin 9 thereby swinging the tie rod 13 to one side or the other, as shown in dotted lines in Fig. 1. The connecting rod 6 will accordingly be shifted transversely of the trailer frame for actuating the steering knuckles in usual manner to turn the wheels 4.

Bar 27 may swing vertically upon pivot 28 and members 15 and 17 may swing horizontally upon member 9, which movements take place while the vehicles are turning laterally in either direction or while said vehicles are passing over undulating portions of the roadway.

The draft from bar 27 to member 9 that is fixed to front axle 2 is transmitted through draw bar 15 and the steering movement to the front wheels 4 is transmitted from bar 27 through yoke 17.

Various changes may be made without departing from the spirit of the invention as claimed.

What is claimed is:

1. The combination with a trailer having steering knuckles and a rod connecting said steering knuckles, of a pin secured to the front axle of the trailer, a sleeve journaled on said pin, an arm projecting rearwardly from said sleeve, which arm is pivotally connected to said connecting rod, arms projecting laterally from said sleeve, a yoke having the rear ends of its arms pivotally connected to the arms that project laterally from the sleeve, a draw bar having its rear end pivotally connected to the pin, and a flexible connection between the forward end of said draw bar and said yoke.

2. The combination with a trailer having steering knuckles and a rod connecting said steering knuckles, of a pin secured to the front axle of the trailer, a sleeve journaled on said pin, an arm projecting rearwardly from said sleeve, which arm is pivotally connected to said connecting rod, arms projecting laterally from said sleeve, a yoke having the rear ends of its arms pivotally connected to the arms that project laterally from the sleeve, a draw bar having its rear end pivotally connected to the pin, a flexible connection between the forward end of said draw bar and said yoke, and a spring mounted on the pin and bearing down on said sleeve.

3. The combination with a trailer having steering knuckles, and a rod connecting said steering knuckles, of a pin secured to the front axle of the trailer, a sleeve journaled on said pin, an arm projecting rearwardly from said sleeve, the rear end of which arm is pivotally connected to the connecting rod, arms projecting laterally from said sleeve, a yoke having the rear ends of its arms pivotally connected to the arms that project laterally from the sleeve, a bearing member secured to and projecting upwardly from the forward end of said yoke, a draw bar fulcrumed to said bearing member and having its rear end pivotally connected to said pin, and a draft member pivotally connected to the forward end of said draw bar.

4. A steering attachment adapted to be applied to a trailing vehicle axle and comprising clamp means consisting of upper and lower plates adapted to be arranged against the bottom and top of the axle, means for fastening the plates so applied, a pin projecting upwardly from the top plate, a sleeve mounted on said pin and having diametrically opposite radial arms and having a rearwardly extending arm to be attached to the connecting link of knuckle levers, a draft bar pivoted on said pin, and a yoke shaped link connected to the forward end of said draft bar and connected to the ends of the radial arms of the sleeve.

In testimony whereof I have signed my name to this specification.

ABRAHAM ARBETBLATT.